United States Patent
Lee et al.

(10) Patent No.: US 9,512,789 B2
(45) Date of Patent: Dec. 6, 2016

(54) SUPERCHARGING ENGINE

(71) Applicant: Hyundai Motor Company, Seoul (KR)

(72) Inventors: Jangsu Lee, Yongin-si (KR); Jongman Jun, Hwaseong-si (KR); Hyeungwoo Lee, Suwon-si (KR); Hyosang Cho, Suwon-si (KR); Seungeun Yu, Seoul (KR); Hyounghyoun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 14/546,165

(22) Filed: Nov. 18, 2014

(65) Prior Publication Data

US 2015/0167565 A1    Jun. 18, 2015

(30) Foreign Application Priority Data

Dec. 18, 2013 (KR) .................. 10-2013-0158592

(51) Int. Cl.
| | |
|---|---|
| *F02B 33/44* | (2006.01) |
| *F02D 13/06* | (2006.01) |
| *F02D 17/02* | (2006.01) |
| *F01L 13/00* | (2006.01) |
| *F02B 21/02* | (2006.01) |

(52) U.S. Cl.
CPC .......... *F02D 17/026* (2013.01); *F01L 13/0015* (2013.01); *F02B 21/02* (2013.01); *F02B 33/44* (2013.01); *F02D 13/06* (2013.01); *Y02T 10/18* (2013.01)

(58) Field of Classification Search
CPC ..... F02D 17/026; F02D 13/06; F01L 13/0015; F02B 33/44; F02B 21/02; Y02T 10/18

USPC ................. 123/68, 70 R, 198 F; 60/611
See application file for complete search history.

(56) References Cited

U.S. PATENT DOCUMENTS 4,369,623 A * 1/1983 Johnson .................. F02G 1/00
                                                      60/39.6
4,534,323 A * 8/1985 Kato .................. F01L 13/0036
                                                    123/198 F (Continued)

FOREIGN PATENT DOCUMENTS

| FR | 3014501 A1 * | 6/2015 | .............. F01L 13/04 |
| JP | 2013-147966 A | 8/2013 | |
| KR | 10-2011-0062626 A | 6/2011 | |

*Primary Examiner* — Thai Ba Trieu
(74) *Attorney, Agent, or Firm* — Morgan, Lewis & Bockius LLP

(57) ABSTRACT

A supercharging engine supplying compressed air to a combustion chamber as intake air may include at least two cylinders, a deactivation cylinder being at least one of the cylinders, and selectively deactivated, a compressed air tank adapted to store compressed air supplied from a combustion chamber of the deactivation cylinder, a compressed air storage passage formed to communicate the compressed air tank with the combustion chamber of the deactivation cylinder, an intake manifold selectively communicating with the compressed air tank, and a compressed air valve selectively opening/closing the compressed air storage passage, in which compressed air may be transmitted from the combustion chamber of the deactivation cylinder to the compressed air tank as the compressed air valve is opened in a compression stroke during deactivation of the deactivation cylinder.

8 Claims, 6 Drawing Sheets

(56) References Cited

U.S. PATENT DOCUMENTS

| | | | | |
|---|---|---|---|---|
| 4,565,167 A * | 1/1986 | Bryant | F02B 33/22 | 123/70 R |
| 5,138,992 A * | 8/1992 | Krieger | F02D 17/02 | 123/198 F |
| 7,007,639 B1 * | 3/2006 | Luttgeharm | F01L 5/14 | 123/68 |
| 7,231,998 B1 * | 6/2007 | Schechter | B60K 6/12 | 180/165 |
| 7,353,786 B2 * | 4/2008 | Scuderi | F02B 21/00 | 123/68 |
| 7,370,630 B2 * | 5/2008 | Turner | F02B 21/00 | 123/299 |
| 7,793,638 B2 * | 9/2010 | Sturman | F02B 21/00 | 123/434 |
| 7,954,472 B1 * | 6/2011 | Sturman | F02D 13/02 | 123/299 |
| 8,689,745 B2 * | 4/2014 | Meldolesi | F02B 33/22 | 123/68 |
| 8,997,488 B2 * | 4/2015 | Guzzella | F02B 21/00 | 60/611 |
| 9,297,325 B2 * | 3/2016 | Sujan | F02D 41/0007 | 60/611 |
| 2003/0233999 A1 * | 12/2003 | Anderson | F02B 75/12 | 123/316 |
| 2008/0072862 A1 * | 3/2008 | Turner | F01L 13/0005 | 123/198 F |
| 2010/0314186 A1 * | 12/2010 | Ma | F02B 33/44 | 180/165 |
| 2011/0220080 A1 * | 9/2011 | Meldolesi | F02B 33/22 | 123/70 R |
| 2012/0186249 A1 * | 7/2012 | Guzzella | F02B 21/00 | 123/559.1 |
| 2013/0306037 A1 * | 11/2013 | Gelez | F02D 13/06 | 123/198 F |
| 2014/0238327 A1 * | 8/2014 | Hagen | F02D 13/06 | 123/1 A |
| 2014/0261325 A1 * | 9/2014 | Scuderi | F02B 33/22 | 123/445 |

* cited by examiner

SUPERCHARGING ENGINE

CROSS-REFERENCE TO RELATED APPLICATION

The present application claims priority to Korean Patent Application No. 10-2013-0158592 filed Dec. 18, 2013, the entire contents of which is incorporated herein for all purposes by this reference.

BACKGROUND OF THE INVENTION

1. Field of the Invention

The present invention relates to a supercharging engine. More particularly, the present invention relates to a supercharging engine utilizing cylinder deactivation and variable valve lift (VVL).

2. Description of Related Art

Generally, an internal combustion engine has features in that a gas mixture is combusted in a combustion chamber, and it is operated by energy generated by combustion heat. The above-mentioned internal combustion engine is generally a multiple-cylinder engine equipped with a plurality of cylinders to increase output of the engine and to reduce noise and vibration.

In recent years, due to increasing energy cost, a cylinder deactivation apparatus (CDA) been under development, the cylinder deactivation apparatus (CDA) being configured to improve fuel consumption by deactivating some of the cylinders installed in the engine when the engine operates in a low horsepower state.

The cylinder deactivation method which is applied to an ordinary cylinder deactivation apparatus operates such that a gas mixture is not supplied and ignition is not performed in some cylinders of a plurality of cylinders, and a gas mixture is supplied and combusted in the other cylinders of the plurality of cylinders. In addition, the cylinder deactivation is realized simply by not injecting fuel in case of a diesel engine.

Meanwhile, a supercharging engine is one in which pre-compressed air is inhaled into a combustion chamber in an intake stroke. Various apparatuses have been invented for supplying the compressed air to the supercharging engine, but the composition of the apparatus which is adapted to supply the compressed air to a combustion chamber of an engine may be complex. Particularly, the apparatus for generating the compressed air supplied to a combustion chamber of an engine has a complex composition or a high manufacturing cost. Further, reactivity in supplying the compressed air may be deteriorated if the route for supplying the compressed air to a combustion chamber of an engine is excessively long.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a supercharging engine having an advantage of having a simple composition.

In addition, various aspects of the present invention are directed to providing a supercharging engine having a further advantage of being effectively operated by the simple composition.

According to various aspects of the present invention, a supercharging engine supplying compressed air to a combustion chamber as intake air, may include at least two cylinders, a deactivation cylinder being at least one of the cylinders, and selectively deactivated, a compressed air tank adapted to store compressed air supplied from a combustion chamber of the deactivation cylinder, a compressed air storage passage formed to communicate the compressed air tank with the combustion chamber of the deactivation cylinder, an intake manifold selectively communicating with the compressed air tank, and a compressed air valve selectively opening/closing the compressed air storage passage, in which compressed air may be transmitted from the combustion chamber of the deactivation cylinder to the compressed air tank as the compressed air valve is opened in a compression stroke during deactivation of the deactivation cylinder.

The compressed air may be supplied to the intake manifold and supercharged to the combustion chamber as the compressed air tank communicates with the intake manifold.

The compressed air storage passage may have a compressed air pipe which is branched so as to communicate with at least two combustion chambers of the deactivation cylinders.

The compressed air pipe may be communicated with a top of the combustion chamber of each deactivation cylinder, and the compressed air valve may be operated as zero lift or normal lift by a variable valve lift apparatus so as to open/close the compressed air pipe.

The compressed air valve may have the zero lift during normal operation and selectively may have the normal lift during the deactivation of the deactivation cylinder.

The supercharging engine may further include a supply valve opening/closing communication between the compressed air tank and the intake manifold.

The supercharging engine may further include a check valve disposed in the compressed air storage passage, preventing backflow of the compressed air transmitted to the compressed air tank.

The supercharging engine may further include an exhaust valve selectively opened/closed to perform exhaust of the combustion chamber, and an intake valve selectively opened/closed to perform intake of the combustion chamber, in which the exhaust valve may be closed when the deactivation cylinder is deactivated.

The exhaust valve may be operated as zero lift or normal lift by a variable valve lift apparatus, and may have the normal lift during normal operation and may have the zero lift during the deactivation of the deactivation cylinder.

The intake valve may be operated as high lift or low lift by a variable valve lift apparatus, and may have the high lift during normal operation and may have the low lift when the deactivation cylinder is deactivated.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
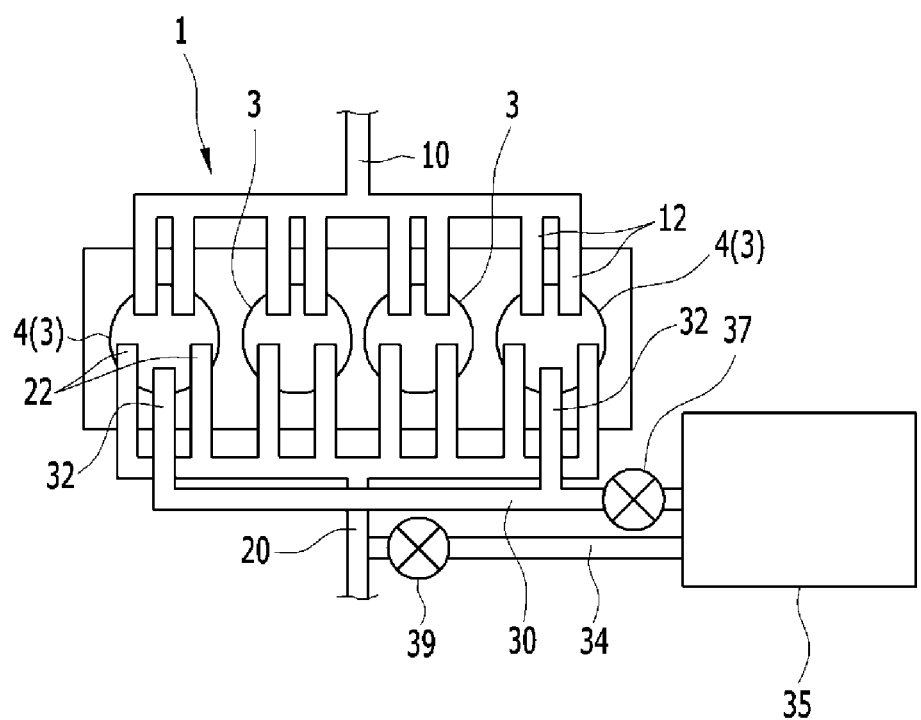
FIG. 1 is a schematic diagram of an exemplary supercharging engine according to the present invention.

FIG. 1 is a schematic diagram of a supercharging engine according to various embodiments of the present invention.

As shown in FIG. 1, a supercharging engine 1 according to various embodiments of the present invention includes a cylinder 3, an exhaust pipe 12, an exhaust manifold 10, an intake pipe 22, an intake manifold 20, a compressed air pipe 32, a compressed air storage passage 30, a compressed air tank 35, a compressed air supply passage 34, a check valve 37, and a supply valve 39.

The cylinder 3 is formed at the supercharging engine 1 such that a piston (not shown) reciprocates therein. A combustion chamber 5 is formed between a head of the cylinder 3 and the piston (referring to FIG. 2). At least two cylinders 3 are disposed. At least one of the at least two cylinders 3 is adapted to perform deactivation. FIG. 1 shows that four cylinders 3 of which two cylinders 3 thereof are adapted to perform deactivation are formed, but the present invention is not limited thereto. Hereinafter, a cylinder 3 which is adapted to perform deactivation will be called a "deactivation cylinder 4". The deactivation cylinder 4 is selectively deactivated, and the selective deactivation of the deactivation cylinder 4 may be performed with various methods known by a person of ordinary skill in the art. For example, the deactivation of a cylinder may be performed by not injecting fuel in a gasoline direct injection (GDI) engine and a diesel engine.

The exhaust manifold 10 is connected to the plurality of exhaust pipes 12.

The intake pipe 22 is formed such that intake air which will be combusted is supplied to the combustion chamber 5. In addition, the intake pipe 22 is adapted such that at least one thereof is connected with each combustion chamber 5. FIG. 1 shows that the two intake pipes 22 are connected with each combustion chamber 5, but the present invention is not limited thereto.

The intake manifold 20 is connected to the plurality of intake pipes 22.

The compressed air pipe 32 is formed such that compressed air generated from the combustion chamber 5 is transmitted therethrough. In addition, the compressed air pipe 32 is adapted such that at least one thereof is connected with the combustion chamber 5 of the deactivation cylinder 4. FIG. 1 shows that the one compressed air pipe 32 is respectively connected with each combustion chamber 5 of the two deactivation cylinders 4 of the four cylinders 3, but the present invention is not limited thereto.

The compressed air storage passage 30 is connected to the compressed air pipes 32. That is, the compressed air pipe 32 is branched from the compressed air storage passage 30 and is connected to the combustion chamber 5 of each deactivation cylinder 4 when at least two deactivation cylinders 4 are formed in the cylinders 3.

The compressed air tank 35 receives compressed air flowed via the compressed air pipe 32 and the compressed air storage passage 30 from the combustion chamber 5 of the deactivation cylinder 4 and stores it.

The compressed air supply passage 34 is formed to transmit compressed air from the compressed air tank 35 to the intake manifold 20. In addition, the compressed air transmitted to the intake manifold 20 is supercharged to the combustion chamber 5 of the supercharging engine 1 via the intake pipe 22.

The check valve 37 is disposed in the compressed air storage passage 30, and prevents backflow of the compressed air transmitted to the compressed air tank 35.

The supply valve 39 is disposed in the compressed air supply passage 34, and is opened or closed such that compressed air is selectively supercharged to the combustion chamber 5 of the supercharging engine 1. That is, the supply valve 39 is opened when compressed air is required for supercharging according to the state of the supercharging engine 1.

Figure 2:
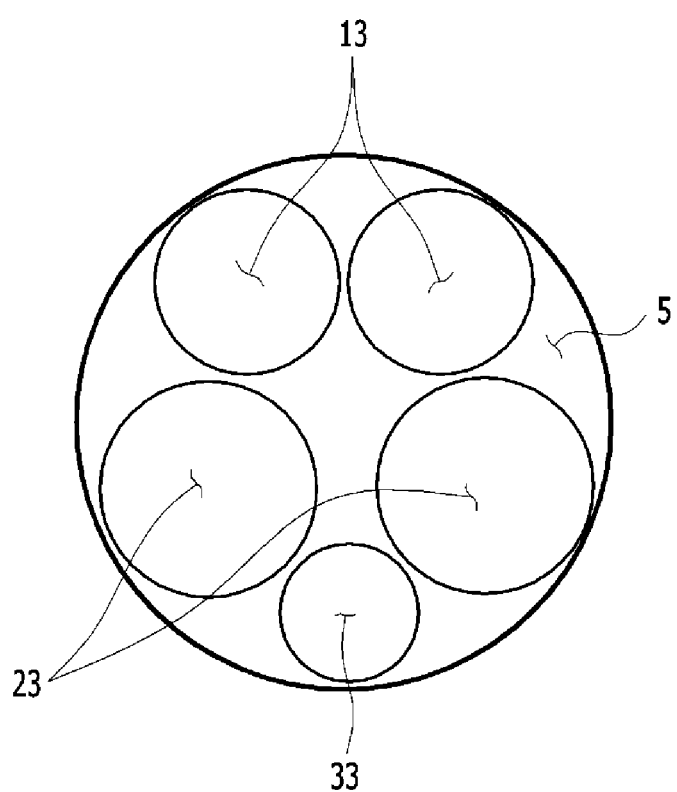
FIG. 2 is a top plan view of a deactivation cylinder combustion chamber of the exemplary supercharging engine according to the present invention.

FIG. 2 is a top plan view of a deactivation cylinder combustion chamber of a supercharging engine according to various embodiments of the present invention.

As shown in FIG. 2, an exhaust hole 13, an intake hole 23, and a compressed air hole 33 which respectively communicate with the exhaust pipe 12, the intake pipe 22, and the compressed air pipe 32 are formed at the top of the combustion chamber 5 of the deactivation cylinder 4 of the supercharging engine 1. In addition, the intake hole 23 is formed as two and the compressed air hole 33 is formed between the two intake holes 23 in case the two intake pipes 22 are connected with the one deactivation cylinder 4 of the supercharging engine 1. That is, the compressed air pipe 32 is disposed between the two intake pipes 22.

Figure 3:
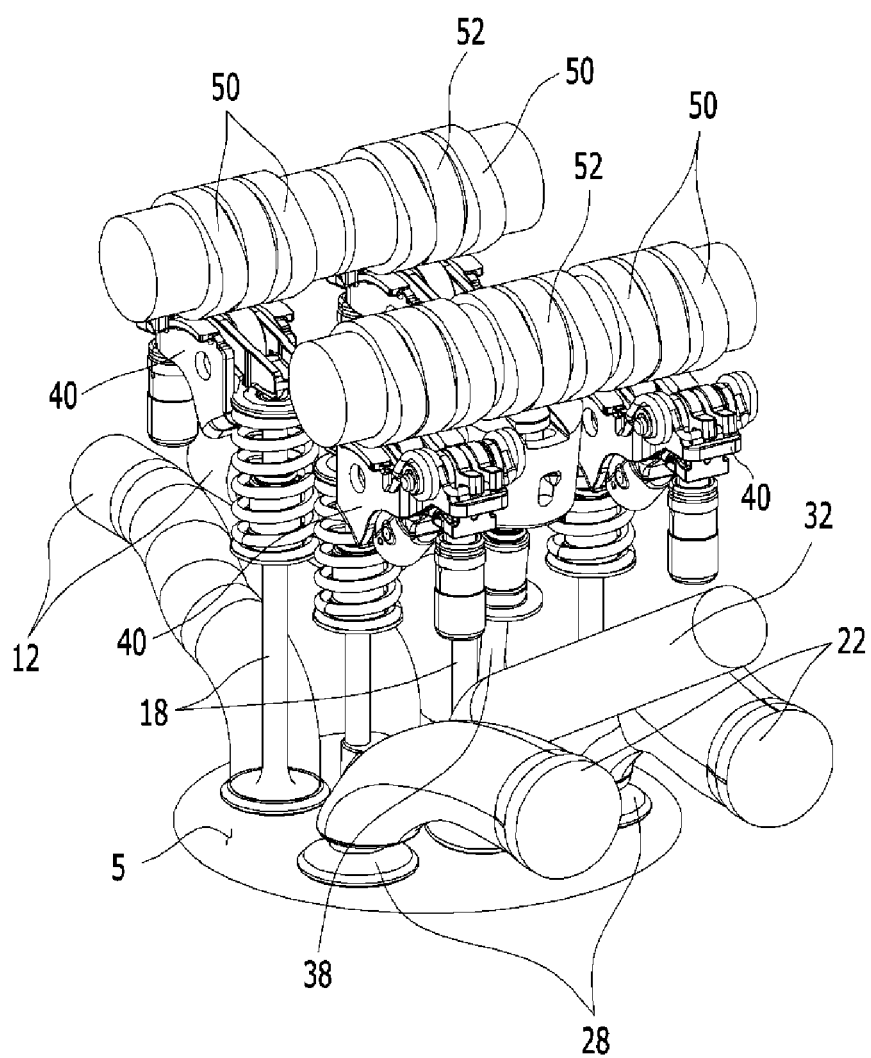
FIG. 3 is a perspective view of a variable valve lift apparatus according to the present invention.

FIG. 3 is a perspective view of a variable valve lift apparatus according to various embodiments of the present invention.

As shown in FIG. 3, an exhaust valve 18, an intake valve 28, and a compressed air valve 38 which are adapted to respectively open/close the exhaust hole 13, the intake hole 23, and the compressed air hole 33 are provided at the top of the combustion chamber 5 of the deactivation cylinder 4 of the supercharging engine 1.

The exhaust valve 18, the intake valve 28, and the compressed air valve 38 are opened/closed by rotation of cams 50 and 52 which rotate together with a camshaft. The cams 50 and 52 and the operation of the valves 18, 28, and 38 which are driven by rotation of the cams 50 and 52 are well known to a person of ordinary skill in the art such that detailed descriptions thereof will be omitted. Meanwhile, the intake valve 28 and the compressed air valve 38 are disposed so as to be opened or closed by rotation of the same camshaft.

A variable valve lift apparatus 40 is respectively interposed between each cam 50 and 52 operating the exhaust valve 18, the intake valve 28, and the compressed air valve 38. Herein, the variable valve lift apparatus 40 is an apparatus which varies lift of the valves 18, 28, and 38, but the variable valve lift apparatus 40 is operated to vary the lift of the valves 18, 28, and 38 by two steps as high/low or normal/zero. In addition, the variable valve lift apparatus 40 which is connected with the compressed air valve 38 which is disposed between the two intake valves 28 may be a direct drive tappet type of variable valve lift apparatus which takes up relatively little space such that interference with surrounding devices is prevented.

The cams 50 and 52, which are rolling-contacted to the variable valve lift apparatus 40 and are connected with each of the valves 18, 28, and 38 so as to perform varying two-step lift of the valves 18, 28, and 38, include a high/normal cam 50 and a low/zero cam 52 which have different cam lifts from each other.

The exhaust valve 18 and the compressed air valve 38 are varied by two steps of normal lift and zero lift. In addition, the exhaust valve 18 and the compressed air valve 38 are connected with the normal cam 50 through the variable valve lift apparatus 40 and thus are operated by the normal lift, and are connected with the zero cam 52 and thus are operated by the zero lift. Herein, the zero lift is the lift in which the valves 18 and 38 are not opened even though the cam 52 rotates.

The intake valve 28 is varied by two steps of high lift and low lift. In addition, the intake valve 28 is connected with the high cam 50 through the variable valve lift apparatus 40 and thus is operated by the high lift, and is connected with the low cam 52 and thus is operated by the low lift.

Figure 4:
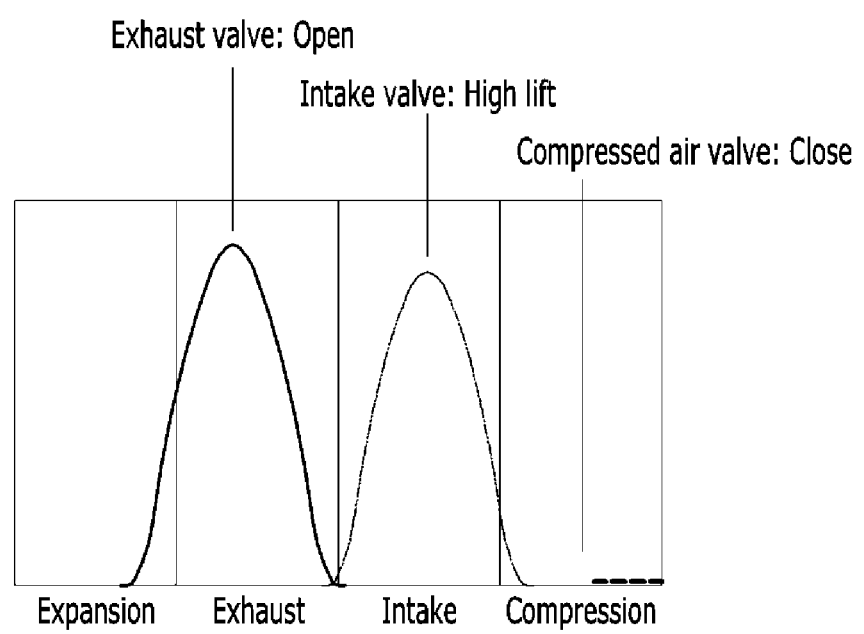
FIG. 4 is a graph showing valve lift of valves which are normally operated.

FIG. 4 is a graph showing valve lift of valves which are normally operated.

As shown in FIG. 4, the exhaust valve 18 is operated by the normal lift, the intake valve 28 is operated by the high lift, and the compressed air valve 38 is operated by the zero lift during normal operation of the supercharging engine 1.

Figure 5:
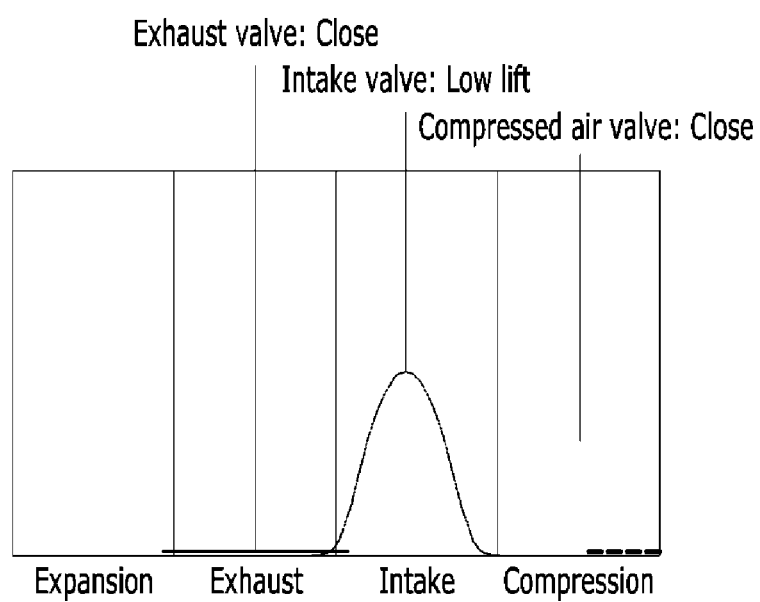
FIG. 5 is a graph showing valve lift of valves which are operated for deactivating a cylinder.

FIG. 5 is a graph showing valve lift of valves which are operated for deactivating a cylinder.

As shown in FIG. 5, the exhaust valve 18 is operated by the zero lift, the intake valve 28 is operated by the low lift, and the compressed air valve 38 is operated by the zero lift when the deactivation cylinder 4 of the supercharging engine 1 is deactivated.

Figure 6:
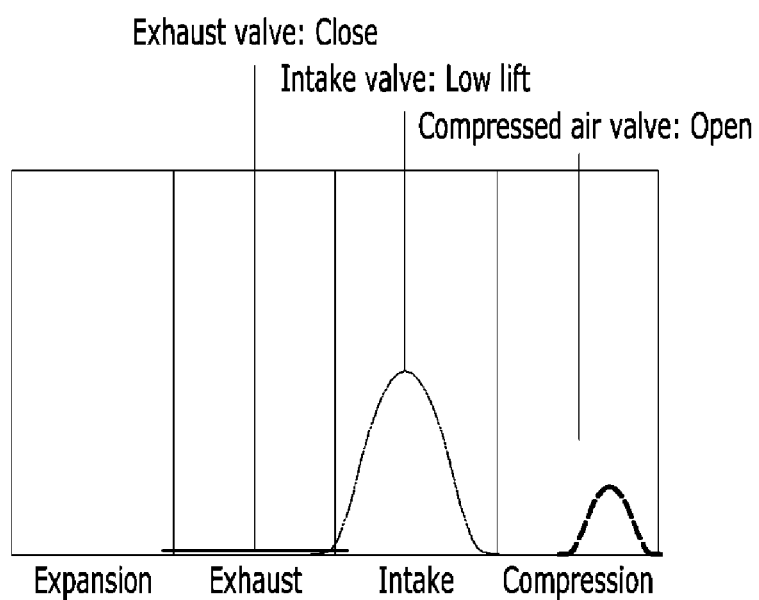
FIG. 6 is a graph showing valve lift of valves which are operated for compressing air.

FIG. 6 is a graph showing valve lift of valves which are operated for compressing air.

As shown in FIG. 6, the compressed air of the combustion chamber is transmitted to the compressed air tank 35 in the compression stroke of the supercharging engine 1 if the exhaust valve 18 is operated by the zero lift, the intake valve 28 is operated by the low lift, and the compressed air valve 38 is operated by the normal lift. That is, the compressed air valve 38 is opened in the compression stroke of the supercharging engine 1 during deactivation of the deactivation cylinder.

The intake valve 28 is always operated by a uniform lift. If the intake valve 28 is always operated by a uniform lift, pumping loss can be minimized in the compression stroke and the expansion stroke of the supercharging engine 1 when the deactivation cylinder 4 of the supercharging engine 1 is deactivated. In addition, constituent elements for varying lift of the intake valve 28 may be removed.

According to various embodiments of the present invention, the composition for storing and supplying the compressed air can be simple by utilizing the cylinder deactivation and the valve lift. In addition, reactivity to supply compressed air may be improved by directly injecting the compressed air to the intake manifold 20. Further, the fuel consumption can be improved as the supercharging and the cylinder deactivation are simultaneously performed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A supercharging engine supplying compressed air to a combustion chamber as intake air, the supercharging engine comprising:
   at least two cylinders;
   a deactivation cylinder being one of the at least two cylinders, being deactivated;
   a compressed air tank adapted to store compressed air supplied from a combustion chamber of the deactivation cylinder;
   a compressed air storage passage formed to communicate the compressed air tank with the combustion chamber of the deactivation cylinder;
   an intake manifold selectively communicating with the compressed air tank via a supply valve; and
   a compressed air valve opening/closing the compressed air storage passage;
      wherein compressed air is transmitted from the combustion chamber of the deactivation cylinder to the compressed air tank as the compressed air valve is opened in a compression stroke during deactivation of the deactivation cylinder; and
      wherein the compressed air storage passage has a compressed air pipe which is branched so as to communicate with at least two combustion chambers of the deactivation cylinders.

2. The supercharging engine of claim 1, wherein the compressed air is supplied to the intake manifold and supercharged to the combustion chamber as the compressed air tank communicates with the intake manifold.

3. The supercharging engine of claim 1, wherein the compressed air pipe is communicated with a reef top of the combustion chamber of each deactivation cylinder, and the compressed air valve is operated as zero lift or normal lift by a variable valve lift apparatus so as to open/close the compressed air pipe.

4. The supercharging engine of claim 3, wherein the compressed air valve has the zero lift during normal operation and selectively has the normal lift during the deactivation of the deactivation cylinder.

5. The supercharging engine of claim 1, further comprising:
   a check valve disposed in the compressed air storage passage, preventing backflow of the compressed air transmitted to the compressed air tank.

6. The supercharging engine of claim 1, further comprising:
   an exhaust valve opened/closed to perform exhaust of the combustion chamber; and
   an intake valve opened/closed to perform intake of the combustion chamber;
      wherein the exhaust valve is closed when the deactivation cylinder is deactivated.

7. The supercharging engine of claim 6, wherein the exhaust valve is operated as zero lift or normal lift by a variable valve lift apparatus, and has the normal lift during normal operation and has the zero lift during the deactivation of the deactivation cylinder.

8. The supercharging engine of claim 6, wherein the intake valve is operated as high lift or low lift by a variable valve lift apparatus, and has the high lift during normal operation and has the low lift when the deactivation cylinder is deactivated.

* * * * *